United States Patent [19]
Watanabe

[11] Patent Number: 5,717,488
[45] Date of Patent: Feb. 10, 1998

[54] APPARATUS FOR MEASURING DISPLACEMENT USING FIRST AND SECOND DETECTING MEANS FOR MEASURING LINEAR AND ROTARY MOTION

[75] Inventor: Hiroshi Watanabe, Utsunomiya, Japan

[73] Assignee: Canon Kabushiki Kaisha, Tokyo, Japan

[21] Appl. No.: 797,476

[22] Filed: Feb. 7, 1997

Related U.S. Application Data

[63] Continuation of Ser. No. 431,980, May 1, 1995, abandoned.

[30] Foreign Application Priority Data

May 13, 1994 [JP] Japan ................... 6-124527

[51] Int. Cl.⁶ .................................................. G01B 9/02
[52] U.S. Cl. .................................. 356/356; 250/237 G
[58] Field of Search ............... 356/356; 250/237 G, 250/231.14, 231.16

[56] References Cited

U.S. PATENT DOCUMENTS

| | | | |
|---|---|---|---|
| 3,856,401 | 12/1974 | Heitmann et al. | 356/28 |
| 4,975,570 | 12/1990 | Nishimura et al. | 250/237 G |
| 5,017,777 | 5/1991 | Ishizuka et al. | 356/356 |
| 5,142,146 | 8/1992 | Morokuma | 250/237 G |

FOREIGN PATENT DOCUMENTS

| | | |
|---|---|---|
| 0426125 | 5/1991 | European Pat. Off. . |
| 0575641 | 12/1993 | European Pat. Off. . |
| 2209667 | 9/1973 | Germany . |
| 4-264264 | 9/1992 | Japan . |

*Primary Examiner*—Frank G. Font
*Assistant Examiner*—Amanda Merlino
*Attorney, Agent, or Firm*—Fitzpatrick, Cella, Harper & Scinto

[57] ABSTRACT

An apparatus for measuring the displacement of an object includes: a diffraction grating arranged on the object, a light source for irradiating a coherence light beam onto the diffraction grating, a first detector for causing two light beams whose phases relatively shift upon linear motion of the object of diffracted light diffracted by the diffraction grating to interfere with each other to detect the interference light beam, and a second detector for causing two light beams whose phases relatively shift upon rotary motion of the object of diffracted light diffracted by the diffraction grating to interfere with each other to detect the interference light beam.

12 Claims, 9 Drawing Sheets

APPARATUS FOR MEASURING DISPLACEMENT USING FIRST AND SECOND DETECTING MEANS FOR MEASURING LINEAR AND ROTARY MOTION

This application is a continuation of Application No. 08/431,980 filed May 1, 1995, now abandoned.

BACKGROUND OF THE INVENTION

1. Field of the Invention

The present invention relates to an encoder for measuring the displacement of an object. More specifically, the present invention can be suitably applied to an encoder such as a rotary encoder, a linear encoder, or the like, which measures movement information, e.g., the moving amount, moving direction, acceleration, angular acceleration, or the like, of a diffraction grating in such a manner that interference fringes are formed by irradiating a coherence light beam such as a laser beam onto a micro-grating array such as a diffraction grating attached to a movable object (scale) and causing diffracted light components of predetermined orders from the diffraction grating to interfere with each other, and the number of dark and light fringes of the interference fringes is counted.

2. Related Background Art

Conventionally, rotary encoders are known as measuring apparatuses which can measure rotation information such as the rotating amount, rotating direction, or the like, of a rotary object with high precision (e.g., on the submicron order) in, e.g., an NC working machine, and such rotary encoders have been used in various fields.

In particular, as a high-precision, high-resolution rotary encoder, a diffracted light interference type rotary encoder is known. The encoder detects the moving state such as the moving amount, moving direction, or the like of a movable object in such a manner that a coherence light beam such as a laser beam is incident on a diffraction grating arranged on a movable object, diffracted light components of predetermined orders diffracted by the diffraction grating are caused to interfere with each other to form interference fringes, and the number of dark and light fringes of the interference fringes is counted.

On the other hand, for example, Japanese Laid-Open Patent Application No. 4-264264 proposed an accelerometer for detecting an acceleration by measuring the elastic deformation of an elastic member. Especially, as an accelerometer which aims at high-precision detection of an acceleration, an acceleration detector utilizing a diffracted light interference type encoder has been proposed. Also, as an angular accelerometer for detecting an angular acceleration, an angular accelerometer such as a piezoelectric vibrator type or an optical fiber type gyroscope has been proposed.

FIG. 1 is a partial schematic view showing principal part of a conventional diffracted light interference type encoder.

Referring to FIG. 1, a monochrome light beam emitted by a light source 101 is incident on a micro-grating array 105, which comprises, e.g., a diffraction grating and has a grating pitch P (the number of grating lines along the perimeter of the diffraction grating is N), on a scale (disk) 105a, thereby generating a plurality of diffracted light components. At this time, the order of a light beam which propagates straight is defined to be 0, and ±1, ±2, ±3, . . . order diffracted light components are defined on the two sides of the 0 order diffracted light. Furthermore, a "+" sign is assigned to the rotating direction of the scale 105a, and a "−" sign is assigned to a direction opposite to the rotating direction of the scale, thereby identifying the above-mentioned light components. Under these assumptions, if the rotating angle of the scale 105a is represented by θ (deg), the phase of the wavefront of the n order diffracted light shifts from that of the 0 order light by:

$$2\pi \cdot n \cdot N \cdot \theta / 360$$

Since the phases of the wavefronts of diffracted light components of different orders shift from each other, when two diffracted light components are caused to interfere with each other by overlapping their optical paths using an appropriate optical system, a density signal is obtained.

For example, when the +1 and −1 order diffracted light components are caused to interfere with each other by overlapping their optical paths using mirrors 109a and 109b and a beam splitter 103, since the phases of these diffracted light components shift from each other by 4π while the scale 105a rotates by one pitch (360/N deg) of the micro-grating array, a change in amount of light of a density pattern for two cycles occurs. Therefore, by detecting the change in amount of light of the density pattern, the rotating amount of the scale 105a can be obtained.

FIG. 2 is a partial schematic view showing the principal part of a conventional diffracted light interference type rotary encoder which detects not only the rotating amount but also the rotating direction of the scale 105a.

In FIG. 2, as compared to the rotary encoder shown in FIG. 1, at least two different density signals obtained from two diffracted light components upon rotation of the scale 105a are prepared, and the rotating direction of the scale 105a is detected by shifting the timings of density changes of these signals.

More specifically, in FIG. 2, before the n and m order diffracted light components diffracted by a micro-grating array 105 are caused to overlap each other, these light components are converted into light beams of linear polarization, whose planes of polarization extend perpendicularly to each other, by utilizing analyzers 108a and 108b, and the like. The optical paths of these two light components are caused to overlap each other via mirrors 109a and 109b and a beam splitter 103a, and these light components are then passed through a quarter-wave plate 107a to be converted into a light beam of linear polarization having a plane of polarization whose direction is determined by the phase difference between the two light beams.

The light beam is split into two light beams by a non-polarization beam splitter 103b, and these light beams are passed through analyzers 108c and 108d which are arranged to have different detecting directions (directions in which light beams of linear polarization can pass therethrough). Then, two different density signals having different density change timings upon interference of the two light beams are detected by detectors 110a and 110b.

For example, when the detecting directions of the two analyzers shift from each other by 45°, the density change timings shift by 90° (π/2) in phase. The rotary encoder shown in FIG. 2 detects the rotation information including the rotating direction of the scale 105a using the signals output from the two detectors 110a and 110b at this time.

In a conventional encoder, when a plurality of kinds of movement information (e.g., rotation information and linear movement information) of an object to be measured are to be detected, two different detection systems must be arranged, resulting in a large, complicated apparatus.

SUMMARY OF THE INVENTION

It is the first object of the present invention to provide an encoder which can simultaneously and independently detect a plurality of kinds of movement information, e.g., movement information in one direction and rotation information about one axis, of an object to be measured with high precision. Furthermore, it is the second object of the present invention to provide an encoder which can simultaneously detect an acceleration in one direction, and an angular acceleration in one direction with high precision, by utilizing the encoder of the first object.

In order to achieve the above objects, a displacement measurement apparatus for an object according to one aspect of the present invention, comprises:

a diffraction grating arranged on the object;

light source means for irradiating a coherence light beam onto the diffraction grating;

first detecting means for causing two light beams whose phases relatively shift upon linear motion of the object of diffracted light diffracted by the diffraction grating to interfere with each other to detect the interference light beam; and second detecting means for causing two light beams whose phases relatively shift upon rotary motion of the object of diffracted light diffracted by the diffraction grating to interfere with each other to detect the interference light beam.

A preferred mode of the object is a rotary object having a rotation axis, and a preferred mode of the diffraction grating at that time is a radial grating having the rotation axis as a center. Alternatively, the diffraction grating at that time is a linear grating arranged in a plane perpendicular to the rotation axis.

A displacement measurement apparatus for an object according to another aspect of the present invention, comprises:

first and second diffraction gratings arranged on the object;

light source means for irradiating a coherence light beam onto the first diffraction grating;

light guide means for guiding a plurality of diffracted light components of a predetermined order diffracted by the first diffraction grating to the second diffraction grating;

first detecting means for causing two light beams whose phases relatively shift upon linear motion of the object of diffracted light diffracted by the second diffraction grating to interfere with each other to detect the interference light beam; and second detecting means for causing two light beams whose phases relatively shift upon rotary motion of the object of diffracted light diffracted by the second diffraction grating to interfere with each other to detect the interference light beam.

A preferred mode of the object is a rotary object having a rotation axis, and a preferred mode of each of the first and second diffraction gratings at that time is a radial grating having the rotation axis as a center. Alternatively, the first and second diffraction gratings are linear gratings which are arranged in a plane perpendicular to the rotation axis and at positions symmetrical about the rotation axis.

A displacement measurement apparatus for an object according to still another aspect of the present invention, comprises:

first and second diffraction gratings arranged on the object;

light source means for irradiating a coherence light beam onto the first and second diffraction gratings;

first detecting means for causing diffracted light diffracted by the first diffraction grating and diffracted light diffracted by the second diffraction grating whose phases relatively shift upon linear motion of the object to interfere with each other to detect the interference light beam; and second detecting means for causing diffracted light diffracted by the first diffraction grating and diffracted light diffracted by the second diffraction grating whose phases relatively shift upon rotary motion of the object to interfere with each other to detect the interference light beam.

A preferred mode of the object is a rotary object having a rotation axis, and a preferred mode of each of the first and second diffraction gratings at that time is a radial grating having the rotation axis as a center. Alternatively, the first and second diffraction gratings are linear gratings which are arranged in a plane perpendicular to the rotation axis and at positions symmetrical about the rotation axis. A multi-eye type image display apparatus according to the present invention will be explained hereinafter in some embodiments.

DETAILED DESCRIPTION OF THE PREFERRED EMBODIMENTS

Figure 1:
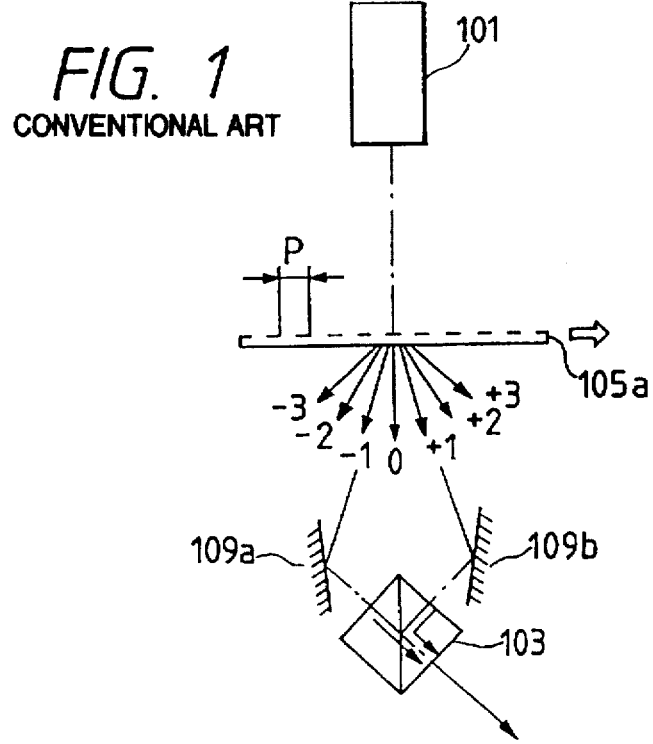
FIG. 1 is a partial schematic view showing a principal part of a conventional rotary encoder.
Figure 2:
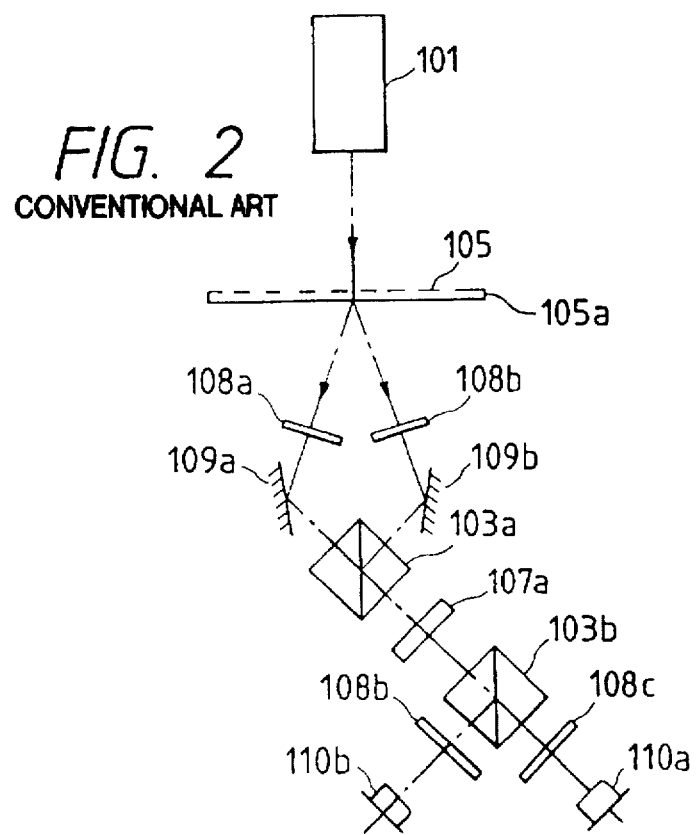
FIG. 2 is a partial schematic view showing a principal part of a conventional rotary encoder.
Figure 3:
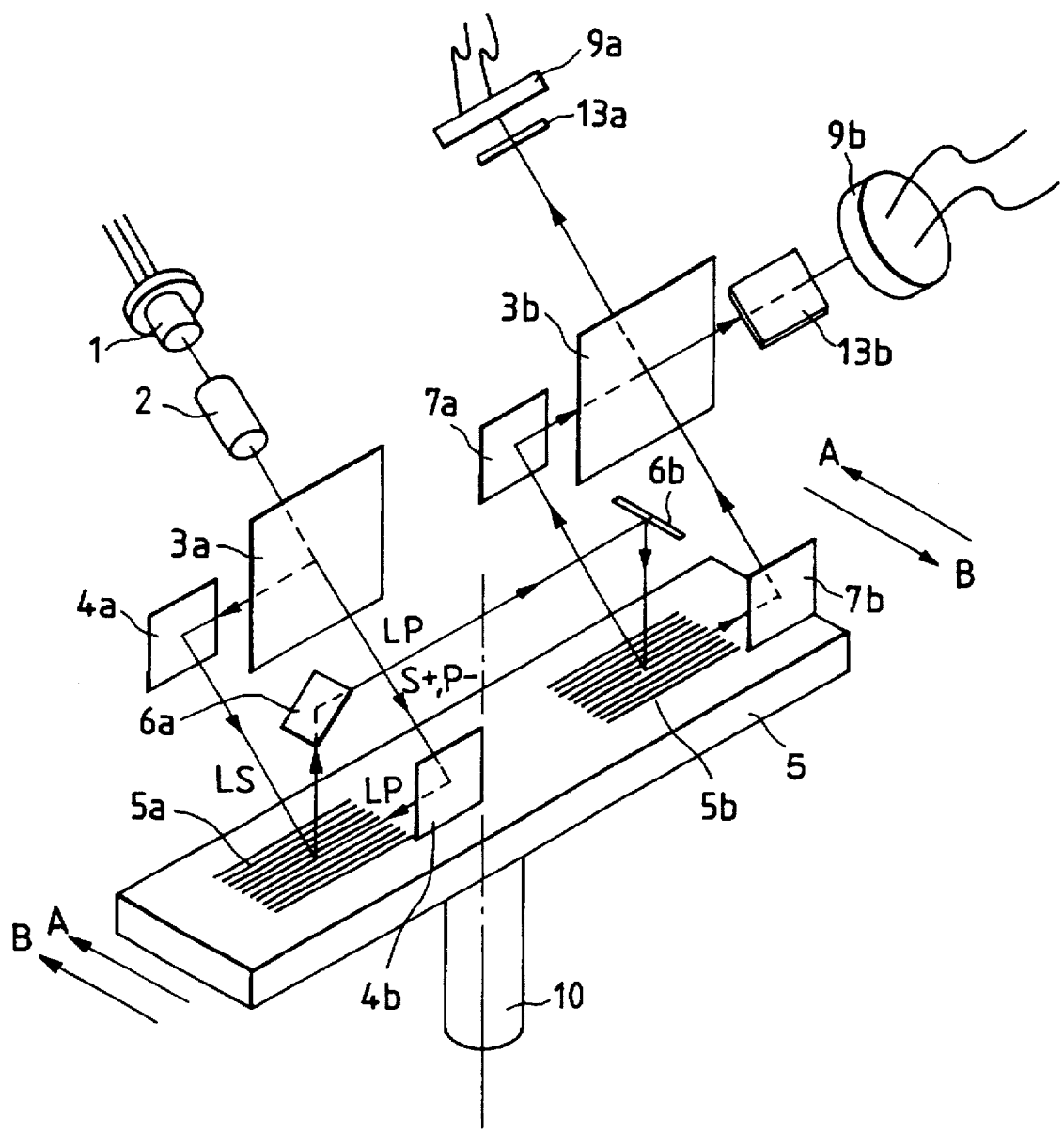
FIG. 3 is a schematic view showing a principal part of the first embodiment of the present invention.

FIG. 3 is a schematic view showing a principal part of the first embodiment of the present invention. This embodiment exemplifies a case wherein two reflection type diffraction gratings 5a, 5b are arranged on an object 5 to be measured having a rigid body; to be also referred to as a scale, and movement information and rotation information of the object to be measured are detected.

Referring to FIG. 3, a light source 1, e.g., a semiconductor laser whose plane of polarization is inclined through, irradiates a coherence light beam including both P- and S-polarization components. A light beam emitted by the light source 1 is shaped by a collimator lens 2, and is split into S and P polarized light components LS and LP by a first polarization beam splitter 3a whose plane of polarization is inclined through 45° from the optical axis. The polarization beam splitter 3a transmits the P polarized light therethrough, and reflects the S polarized light.

The P polarized light is reflected by a mirror 4b and is incident on a first diffraction grating 5a. On the other hand, the S polarized light is reflected by a mirror 4a, and is incident on the first diffraction grating 5a. At this time, the two light components are obliquely incident on a single point from two directions, so that the incident angles of the two light components are equal to the 1 order diffraction angle. The +1 order diffracted light S+ of S-polarization and −1 order diffracted light P− of P-polarization are reflected and diffracted in a single direction perpendicular to the surface of the diffraction grating 5a.

The +1 order diffracted light S+ and −1 order diffracted light P− are perpendicularly incident on a second diffraction grating 5b, which is arranged at a symmetrical position about a rotation axis (shaft) 10 of torsion of the object to be measured (elastic member) with respect to the first diffraction grating 5a, using deflection means 6a and 6b such as mirrors.

Figure 4:
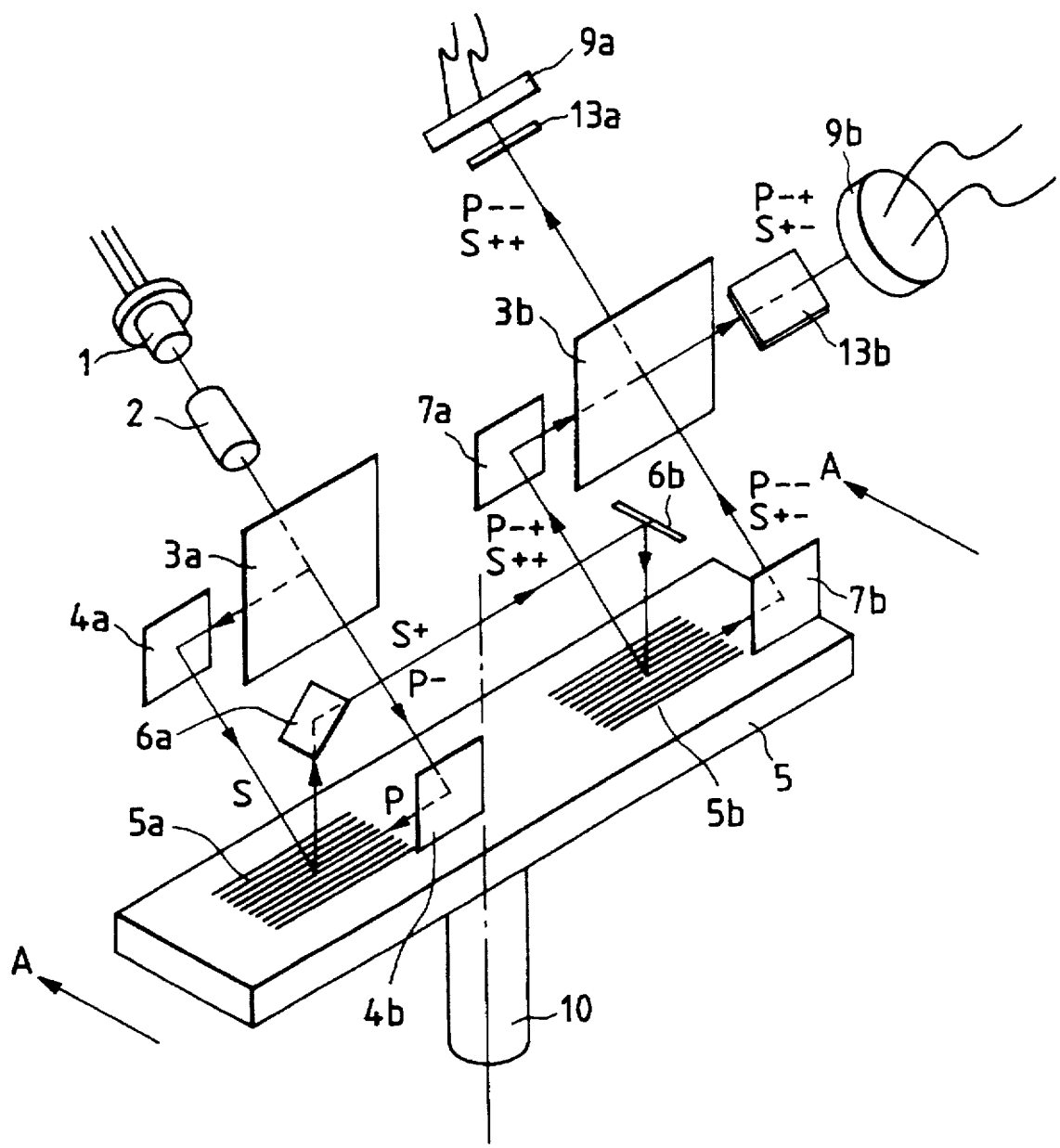
FIG. 4 is a schematic view showing a principal part when a scale is displaced in a direction A in FIG. 3.
Figure 6:
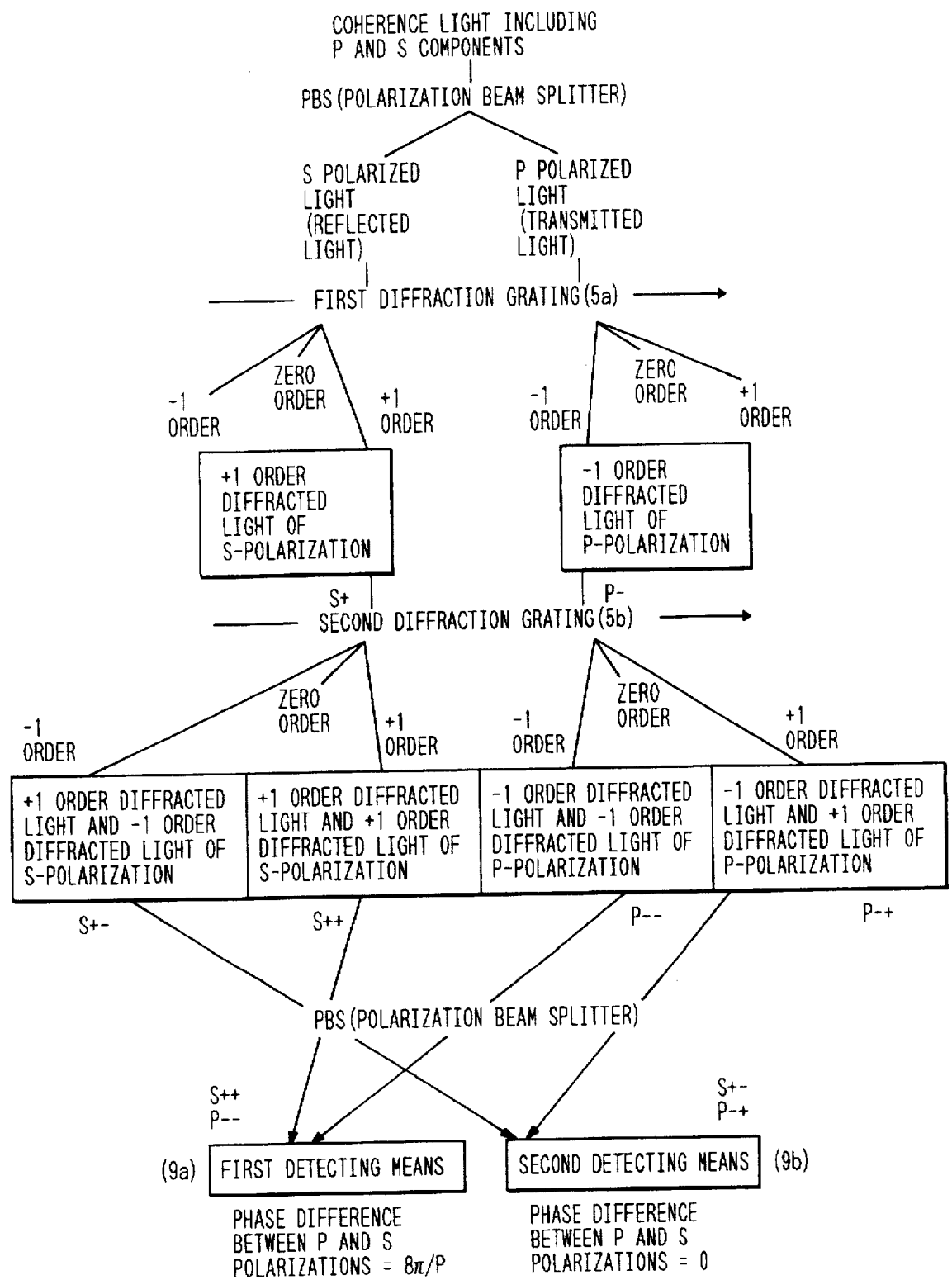
FIG. 6 is a block diagram for explaining the state wherein scale is displaced in the direction A in FIG. 3.

FIG. 4 is a schematic view when the scale 5 moves in the direction A at that time, and FIG. 6 is a block diagram for explaining the respective components in FIG. 4.

Referring to FIGS. 4 and 6, P polarized light P−− and S polarized light S+− which are −1-order-diffracted by the second diffraction grating 5b are reflected by a mirror 7b and are guided toward a polarization beam splitter 3b. On the other hand, P polarized light P−+ and S polarized light S++ which are +1-order-diffracted by the second diffraction grating 5b are reflected by a mirror 7a and are guided toward the polarization beam splitter 3b. The polarization beam splitter 3b superposes these polarized light components.

Of these light beams, the S polarized light S++ and the P polarized light P−− which have a relative phase difference of 8π therebetween are guided to an analyzer 13a, and are detected by a first photodetector (first detecting means) 9a, and the S polarized light S+− and the P polarized light P−+ which have a relative phase difference of 0 therebetween are guided to an analyzer 13b and are detected by a second photodetector (second detecting means) 9b. At this time, the photodetector 9a detects movement information, but the photodetector 9b does not detect any movement information.

Figure 5:
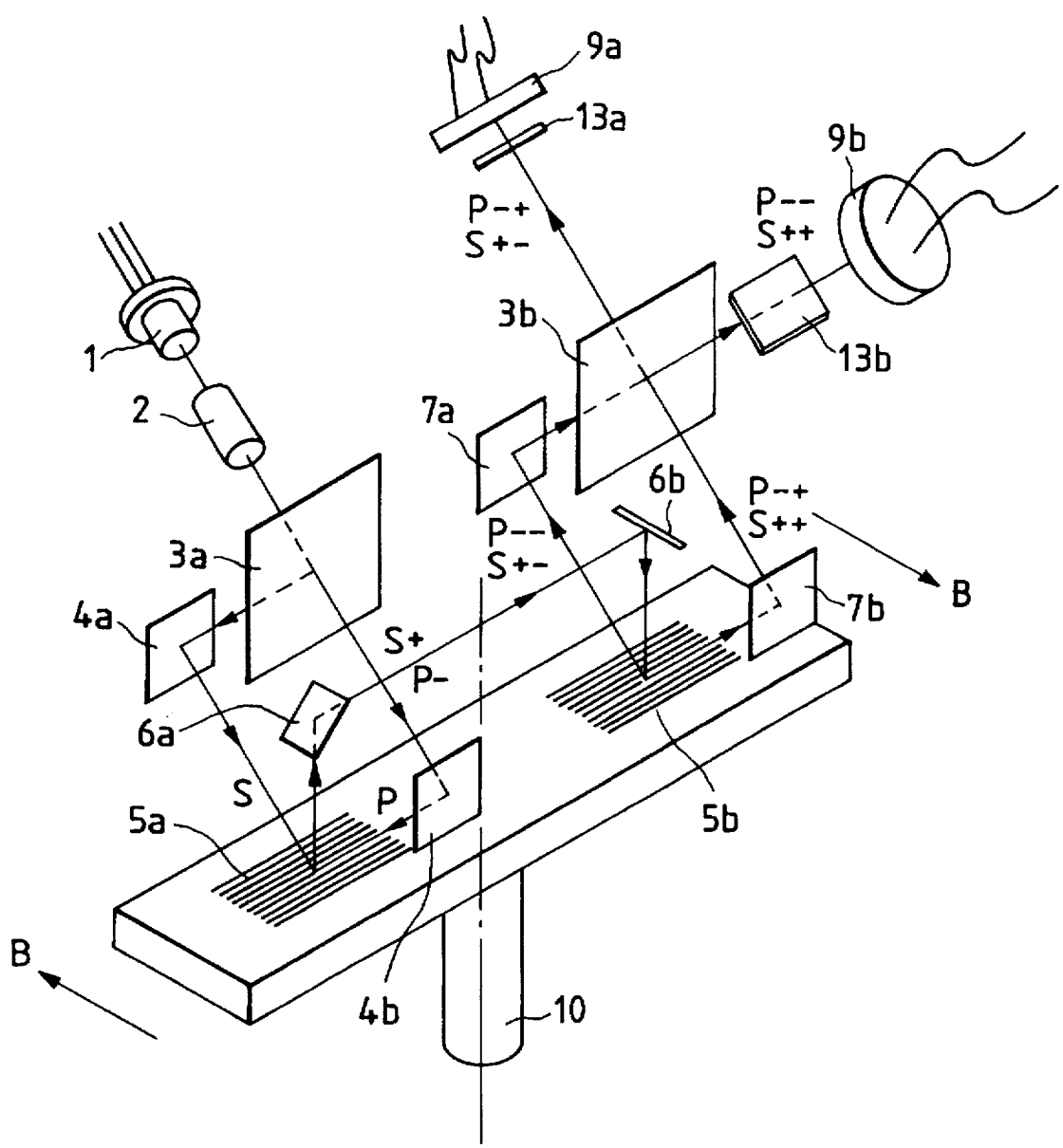
FIG. 5 is a schematic view showing a principal part when the scale is displaced in directions B in FIG. 3.
Figure 7:
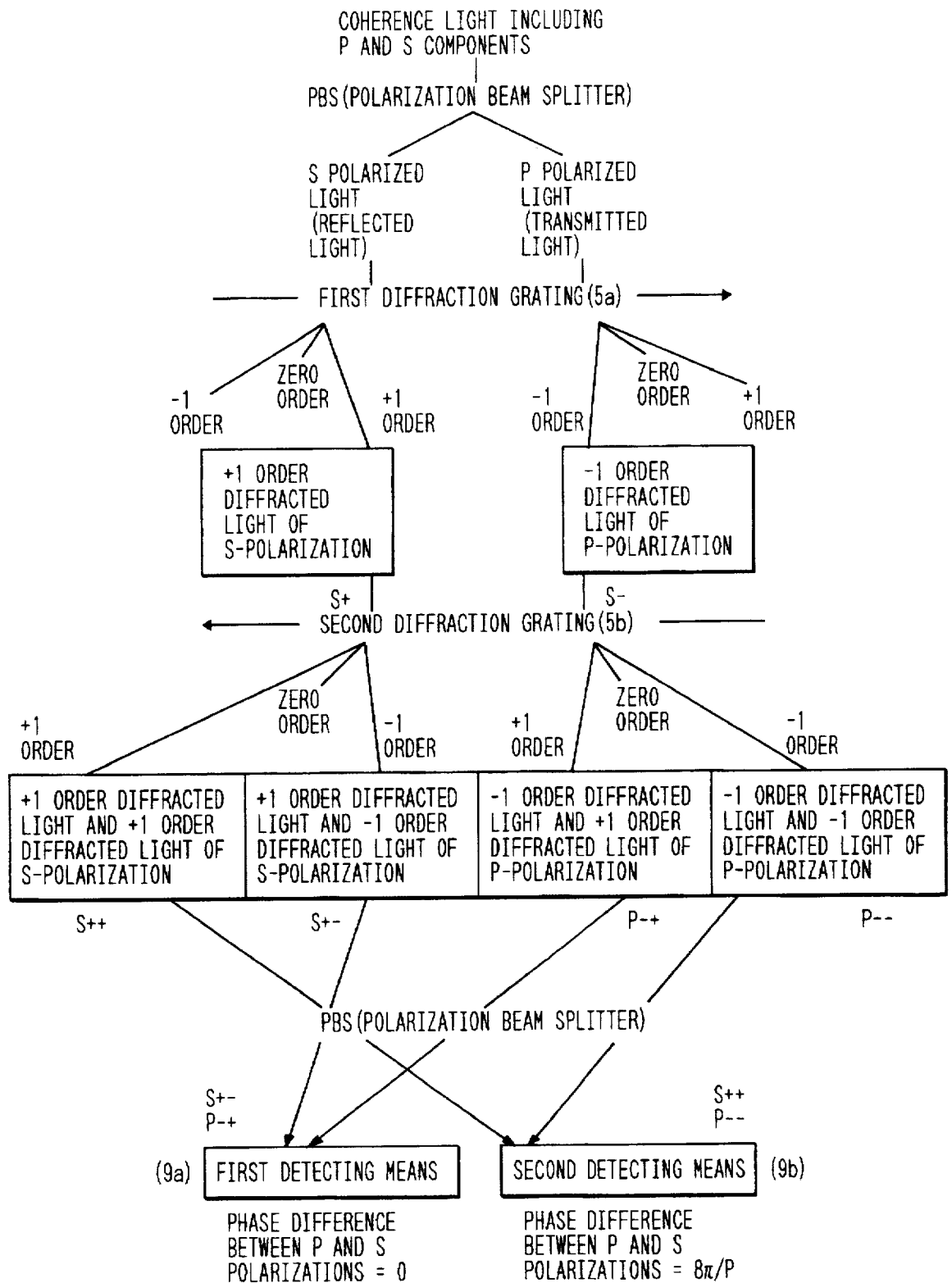
FIG. 7 is a block diagram for explaining the state wherein scale is displaced in the directions B in FIG. 3.

FIG. 5 is a schematic view when the scale 5 moves in directions B in FIG. 3, and FIG. 7 is a block diagram for explaining the components in FIG. 5.

Referring to FIGS. 5 and 7, P polarized light P−− and S polarized light S+− which are −1-order-diffracted by the second diffraction grating 5b are reflected by the mirror 7a and are guided toward the polarization beam splitter 3b. On the other hand, P polarized light P−+ and S polarized light S++ which are +1-order-diffracted by the second diffraction grating 5b are reflected by the mirror 7b and are guided toward the polarization beam splitter 3b. The polarization beam splitter 3b superposes these polarized light components.

Of these light beams, the P polarized light P−+ and the S polarized light S+− which have a relative phase difference of 0 therebetween are detected by the first photodetector 9b via the analyzer 13a, and the P polarized light P−− and the S polarized light S++ which have a relative phase difference of 8π therebetween are detected by the second photodetector 9b via the analyzer 13b. At this time, the photodetector 9b detects movement information, but the photodetector 9a does not detect any movement information.

In this embodiment, a signal processing system (not shown) detects the movement information of a movable object using signals output from the photodetectors 9a and 9b. The detection principle of the movement information of a movable object in this embodiment will be described below with reference to FIGS. 6 and 7. In FIGS. 6 and 7, the order m of the m order diffracted light is set to be m=1.

Figure 8:
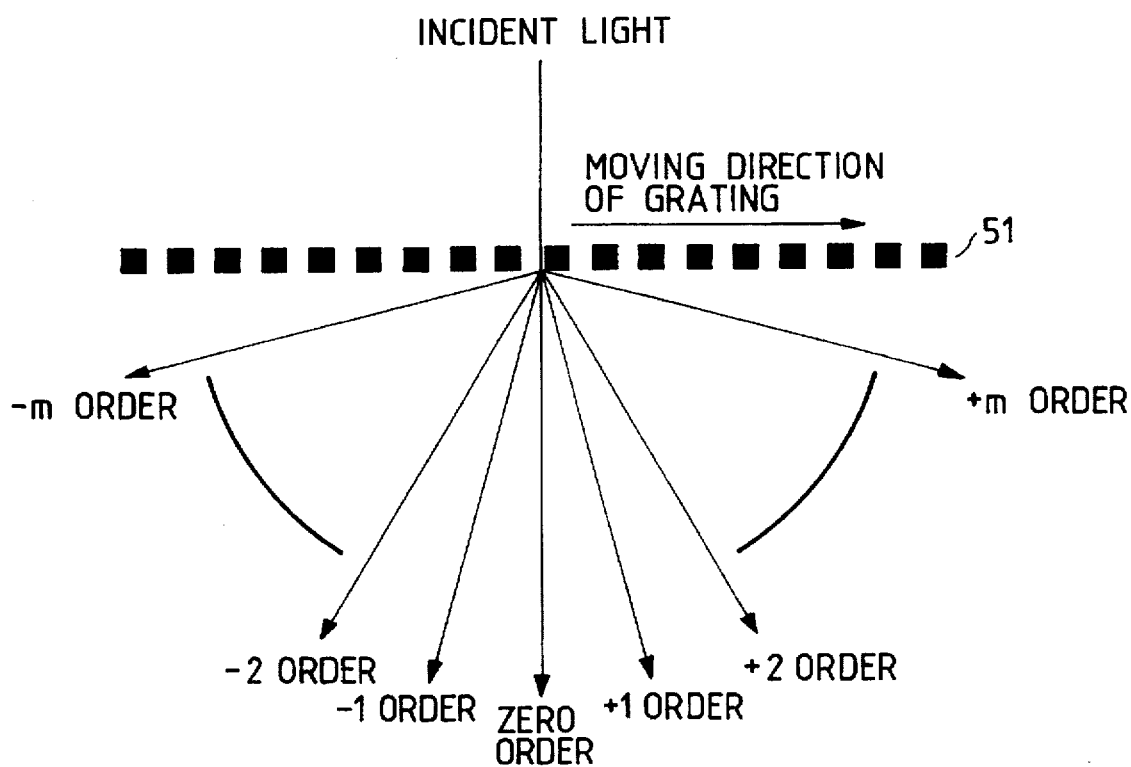
FIG. 8 is an explanatory view showing the relationship between the moving direction of a diffraction grating according to the present invention and diffracted light components.

FIG. 8 is an explanatory view showing the relationship between the moving direction of the grating and the diffraction orders. As shown in FIG. 8, when coherence light of a wavelength λ is incident on a diffraction grating 51 formed with slits at a predetermined pitch P, the following diffracted light components are generated in the direction of an angle θ:

$$P\sin\theta = m\lambda \quad (m=0, \pm 1, \ldots)$$

Note that m order diffracted light, which is diffracted in the moving direction of the diffraction grating, is defined as +m order diffracted light, and m order diffracted light, which is diffracted in a direction opposite to the moving direction, is defined as −m order diffracted light. When the diffraction grating 51 moves by X, the phase of the m order diffracted light changes by the following amount before and after the movement:

$$\Delta\phi(X) = \frac{2m\pi X}{P}$$

Therefore, the phase of the 1 order diffracted light (m=1) changes by 2π upon movement of the diffraction grating by one pitch.

In a diffracted light interference type encoder, light which is +1-order-diffracted twice and light which are −1-order-diffracted twice by a diffraction grating arranged on a scale are caused to overlap each other, so that the phases of the two light components relatively shift by 8π per pitch of the grating. Therefore, upon movement of the scale by one pitch of the grating, a change in phase for four cycles is generated.

In this embodiment, the +m order diffracted light diffracted by the diffraction grating is a light component, which is diffracted in the moving direction of the diffraction grating, of the m order diffracted light, and the −m order diffracted light is a light component, which is diffracted in the direction opposite to the moving direction of the diffraction grating, of the m order diffracted light.

For example, in a diffracted light interference type rotary encoder, upon rotation of a scale comprising a radial diffraction grating, a relative phase difference between light which is +m-order-diffracted twice and light which are −m-order-diffracted twice changes by 8mπ with respect to a change in angle corresponding to one pitch of the diffraction grating. In this embodiment, by detecting interference light of these two light components at that time, the rotation information of a rotary object (diffraction grating) is detected.

On the other hand, the m order diffracted light is considered in a state wherein two parallel diffraction gratings on a scale move by the same amount in a direction perpendicular to the grating. A light beam from a coherence light source is caused to become incident on a first diffraction grating, +m diffracted light Lm and −m diffracted light L−m from the first diffraction grating are transmitted using light transmission means such as a lens, prism, mirror, optical fiber, and the like, and are caused to become 5 incident on a second diffraction grating. At this time, the second diffraction grating generates four different m order diffracted light components, i.e., +m order diffracted light Lm,m of the +m order diffracted light, −m order diffracted light Lm,−m of the +m order diffracted light, +m order diffracted light L−m,m of the −m order diffracted light, and −m order diffracted light L−m,−m of the −m order diffracted light.

When the scale 5 moves in the direction A, the +m order diffracted light Lm,m of the +m order diffracted light and the −m order diffracted light L−m,−m of the −m order diffracted light are caused to interfere with each other, as shown in FIGS. 4 and 6. Since the phases of these light components relatively shift by $8m\pi$ per movement by one pitch of the diffraction grating, the interference light is detected by a first detecting system, which has a device (photodetector) such as a photodiode, CCD, or the like, thereby detecting the movement information of the diffraction grating.

Also, the −m order diffracted light Lm,−m of the +m order diffracted light and the +m order diffracted light L−m,m of the −m order diffracted light are detected by a second detecting system similar to the first detecting system. When both the two diffraction gratings move in the direction perpendicular to the grating, since the two diffracted light components Lm,−m and L−m,m which reach the second detecting system are in phase with each other, the interference signal does not change. For this reason, no movement information is obtained.

Another case will be examined below wherein the scale 5 moves in the directions B, i.e., the two diffraction gratings move in directions perpendicular to the grating, so that one of the two diffraction gratings moves in the same direction as the direction A, and the other diffraction grating moves in the direction opposite to the moving direction of the former diffraction grating (i.e., the two diffraction gratings move in opposite directions perpendicular to the grating) (see FIGS. 5 and 7).

This case corresponds to a state wherein the scale rotates in a plane. In this case, the two diffracted light components Lm,−m and L−m,m which reach the above-mentioned first detecting system do not have any phase difference therebetween. However, the two diffracted light components Lm,m and L−m,−m which reach the second detecting system relatively have a phase difference of $8m\pi$ when the first and second diffraction gratings have a moving amount difference corresponding to two pitches, as in the above-mentioned case wherein the gratings move in the same direction.

For example, when the two diffraction gratings are arranged on a single rigid body (object to be measured) to be parallel to a direction connecting two irradiation points, the signal output from the first detecting system becomes a signal which represents a movement in the direction perpendicular to the grating on the diffraction grating surface at the middle point between the irradiation points of the two diffraction gratings. A case will be examined below wherein the rigid body rotates in a plane including the diffraction gratings. If the rotation angle is very small, it can be considered that the two diffraction gratings linearly move in opposite directions, and the second detecting system can detect the rotation angle in the plane including the two gratings.

When the two diffraction gratings comprise radial diffraction gratings as in the conventional diffracted light interference type rotary encoder, the detection range in the rotation direction can be widened. At this time, since the directions of the gratings change upon linear movement, the detection range of a linear displacement becomes narrower than that defined by parallel diffraction gratings.

In this embodiment, the movement information of a movable object is detected by utilizing the above-mentioned detection principle. The detection method of this embodiment will be described in detail below.

(2-1) When both the two diffraction gratings are displaced in the direction of an arrow A, as shown in FIG. 4 (the diffraction grating scale linearly moves in a direction perpendicular to the grating):

In this case, light components which are transmitted through the polarization beam splitter 3b, and reach the photodetector 9a (first detecting system) via the analyzer 13a are P polarized light P—— which is −1-order-diffracted twice, and S polarized light S++ which is +1-order-diffracted twice, and the relative phase difference between these light components is $8\pi$ upon displacement of the grating by one pitch. These light components are transmitted through analyzers (not shown) whose axes of polarization are set at 45° with respect to the corresponding linear polarizations to be converted into linearly polarized light components defined by the axes of polarization, and these converted light components are detected by the photodetector 9a as movement of interference fringes upon movement of the gratings. Using a signal output from the photodetector 9a, calculation means (not shown) calculates the movement information of the gratings, i.e., the movement information of the shaft 10 of torsion of the elastic member.

On the other hand, light components which are reflected by the polarization beam splitter 3b and reach the photodetector 9b (second detecting system) via the analyzer 13b are P polarized light P—+ which is −1-order-diffracted and +1-order-diffracted, and S polarized light S+— which is +1-order-diffracted and −1-order-diffracted. In this case, no phase difference is generated upon movement of the gratings. For this reason, the photodetector 9b detects no change in interference state, and no signal is obtained.

(2-2) When the two diffraction gratings rotate in the directions of arrows B, as shown in FIG. 5 (a state wherein the scale on which the gratings are arranged rotates):

More specifically, when the object to be measured rotates about the rotation axis 10, light components which are transmitted through the polarization beam splitter 3b and reach the photodetector 9a via the analyzer 13a are P polarized light P+— which is −1-order-diffracted and +1-order-diffracted, and S polarized light S+— which is +1-order-diffracted and −1-order-diffracted, and no phase difference is generated upon rotation of the gratings. For this reason, no rotation information is acquired.

On the other hand, light components which are reflected by the polarization beam splitter 3b and reach the photodetector 9b via the analyzer 13b are P polarized light P—— which is −1-order-diffracted twice, and S polarized light S++ which is +1-order-diffracted twice, and the relative phase difference is $8\pi$ upon rotation for one pitch in the plane including the gratings. These light components are transmitted through analyzers (not shown) whose axes of polarization are respectively inclined through 45° with respect to the P and S polarizations, so as to be converted into linearly polarized light components defined by the axes of polarization. The photodetector 9b detects movement of interference fringes, thereby detecting the rotation information in the plane including the gratings.

In this embodiment, the photodetector 9a shown in FIG. 4 obtains a signal corresponding to the displacement, in the direction A, of the gratings, and the photodetector 9b in FIG. 5 obtains a signal corresponding to the rotation, in the plane, of the grating. Especially, when the flexure and torsion of the beam (shaft) 10 on which the diffraction gratings are arranged are simultaneously detected based on the detection signals from the photodetectors 9a and 9b, an acceleration and angular acceleration applied to the beam 10 are detected. A description of a method of detecting an acceleration or angular acceleration based on a displacement or angular displacement will be omitted since the method is known to those who are skilled in the art.

In the arrangement shown in FIG. 3, since the inclinations of the grating shift and the directions of polarization shift upon rotation in the plane, the rotation angle is limited to a very small amount. However, according to the arrangement of this embodiment, the rotation angle of the scale can be measured while the center of rotation is not limited to two incidence points of light.

In this embodiment, as light deflection and transmission means, mirrors are used. Alternatively, prisms utilizing refraction, optical fibers, optical waveguides, and the like may be used as long as they can deflect the propagating direction of light. In this embodiment, in order to obtain a signal optical path for the S and P polarized light components between the first and second diffraction gratings $5a$ and $5b$, the incidence angle of light to the first diffraction grating $5a$ is set to be the same as that of the 1 order diffracted light generated by the grating $5a$. Alternatively, an arrangement, in which the two light components are incident at different angles and are transmitted along different optical paths, may be adopted.

Furthermore, when the direction of motion is to be detected, the moving direction of interference fringes must be detected. In this case, as a method realized in a diffracted light interference type encoder, the number of interference fringes in a light beam of interference light is set to be close to 0. At this time, the interference light becomes a repetitive density pattern upon movement of the scale. An optical system shown in FIG. 9 may replace the quarter-wave plate $8a$ ($8b$) and the photodetector $9a$ ($9b$) shown in FIG. 3.

Figure 9:
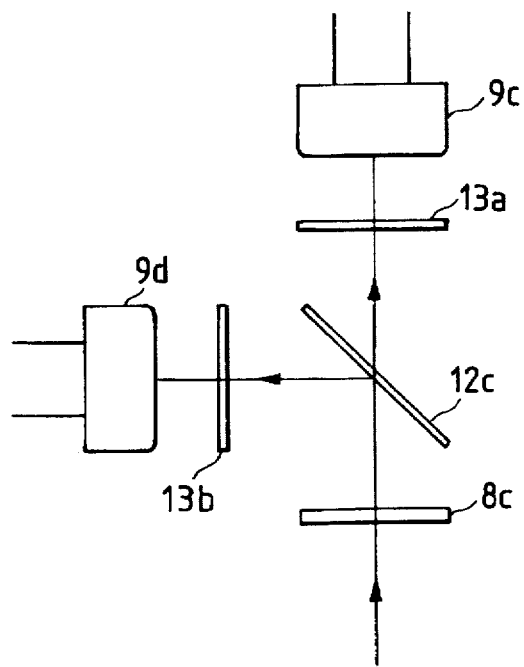
FIG. 9 is an explanatory view upon partial modification of the arrangement shown in FIG. 3.

Referring to FIG. 9, a quarter-wave plate $8c$ has a fast axis, which is set at 45° with respect to P and S polarized light components, and converts the P and S polarized light components into circularly polarized light components having opposite rotating directions. Interference light of these light components is linearly polarized light which rotates upon movement of the scale. The interference light is split into two light beams by a non-polarization beam splitter 12, and the two rotating linearly polarized light components are detected as sinusoidal light density patterns having a 90° phase difference therebetween by photodetectors $9c$ and $9d$ via analyzers $13a$ and $13b$ having a 45° difference between their directions of polarization.

The photodetectors $9c$ and $9d$ detect density patterns of two phase light components which have a 90° phase difference therebetween, thereby obtaining the information of the moving direction of the object to be measured. When the object to be measured is simultaneously displaced in both the direction A and directions B in FIG. 3, different kinds of movement information are respectively obtained from the photodetectors $9a$ and $9b$.

Figure 10:
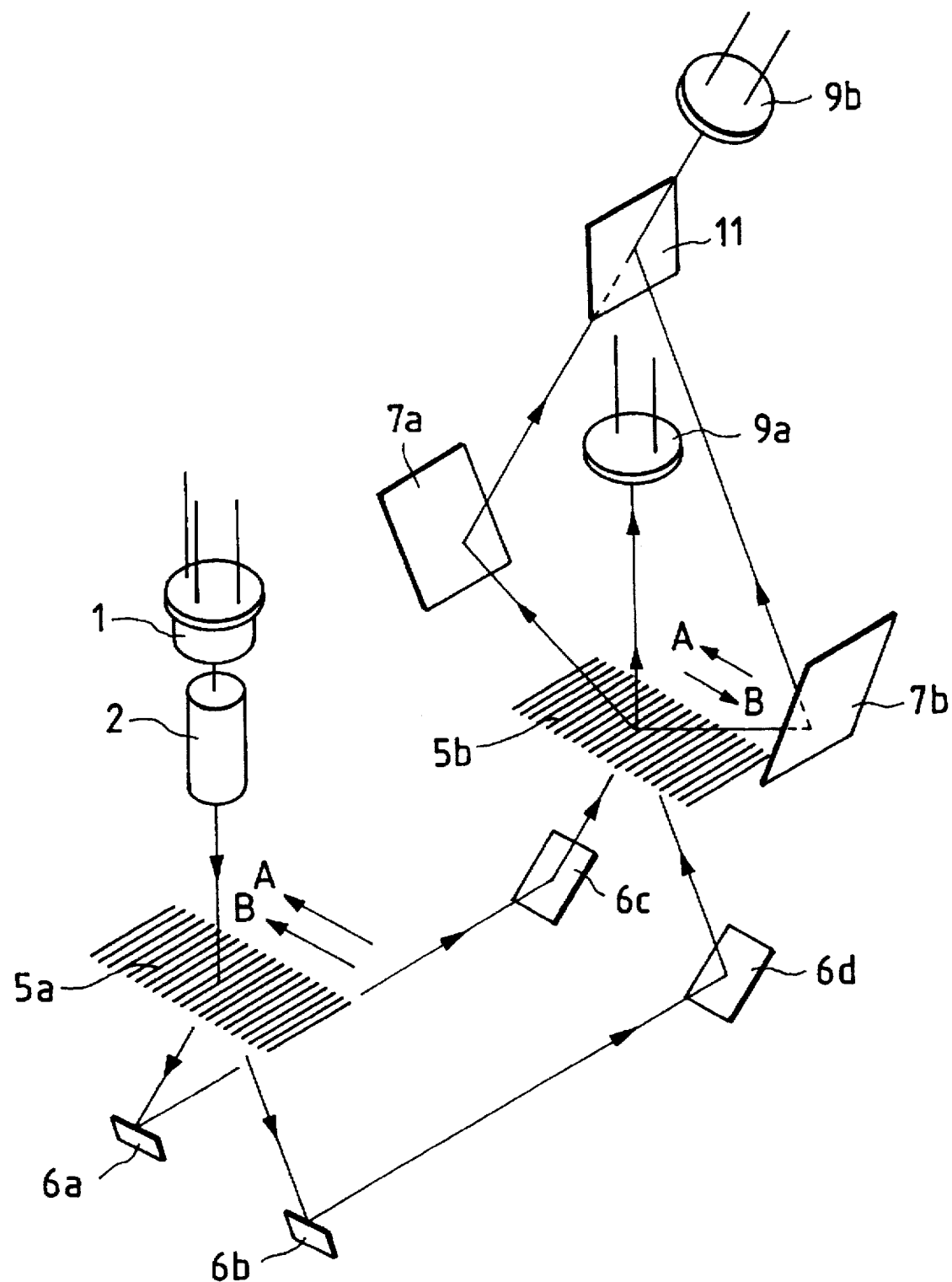
FIG. 10 is a schematic view showing a principal part of the second embodiment of the present invention.

FIG. 10 is a schematic view showing principal part of the second embodiment of the present invention. This embodiment has substantially the same arrangement as that of the first embodiment shown in FIG. 3, except that transmission type diffraction gratings are used in place of the reflection type diffraction gratings, a light beam emitted by the light source 1 is perpendicularly incident on the first diffraction grating, diffracted light components of predetermined orders are obliquely incident on the second diffraction grating, and so on.

Referring to FIG. 10, a light beam which is emitted by a light source 1 and is shaped by a collimator lens 2 is perpendicularly incident on a first diffraction grating $5a$. The +1 order diffracted light and −1 order diffracted light, which are diffracted by the diffraction grating $5a$, are incident on a second diffraction grating $5b$ at the same angle as the 1 order diffraction angle via mirrors $6a$ and $6b$, and mirrors $6c$ and $6d$, respectively. The +1 order diffracted light and −1 order diffracted light, which are diffracted by the diffraction grating $5b$, are caused to overlap each other, and are detected by a photodetector $9a$, and by a photodetector $9b$ via mirrors $7a$ and $7b$ and a half mirror 11.

(3-1) When the two diffraction gratings move in a direction A in FIG. 10:

At this time, light which is +1-order-diffracted twice and light which is −1-order-diffracted twice are incident on the photodetector $9a$ to overlap each other, as in FIG. 4. As a result, when the diffraction gratings move by one pitch, the phases of the two diffracted light components relatively shift by $8\pi$, as in the first embodiment described above.

In this embodiment, by counting the number of interference fringes based on this phase shift, the displacement information of the diffraction gratings is detected. Since no phase difference is generated in the light detected by the photodetector $9b$ due to movement of the diffraction gratings, a signal obtained from the photodetector $9b$ does not represent a change in interference state, and hence, no movement signal is obtained.

(3-2) When the two diffraction gratings move in directions of arrows B in FIG. 10:

More specifically, when the two diffraction gratings rotate about a rotation shaft (not shown), light components which are diffracted by the diffraction grating $5b$ and reflected by the mirrors $7a$ and $7b$ are caused to overlap each other by the half mirror 11, and the photodetector $9b$ detects interference light of light which is +1-order-diffracted twice and light which is −1-order-diffracted twice. By counting the number of interference fringes formed by superposing two light components from the signal obtained from the photodetector $9b$ at this time, the rotation information of the diffraction gratings is detected.

In this case, since no phase difference is generated in the light detected by the photodetector $9a$, the photodetector $9a$ does not provide a signal associated with rotation information.

When the encoder according to the present invention, which can detect movement information in two directions, is applied to diffraction gratings formed on portions of a casing and an elastic member, a torsion caused by the angular acceleration of the elastic member is detected as a rotation of a scale, thus detecting the angular acceleration. At the same time, when a flexure of the elastic member is detected as a translation of the scale, an acceleration can be detected. Thus, the acceleration and angular acceleration can be simultaneously measured by a single optical system.

Figure 11:
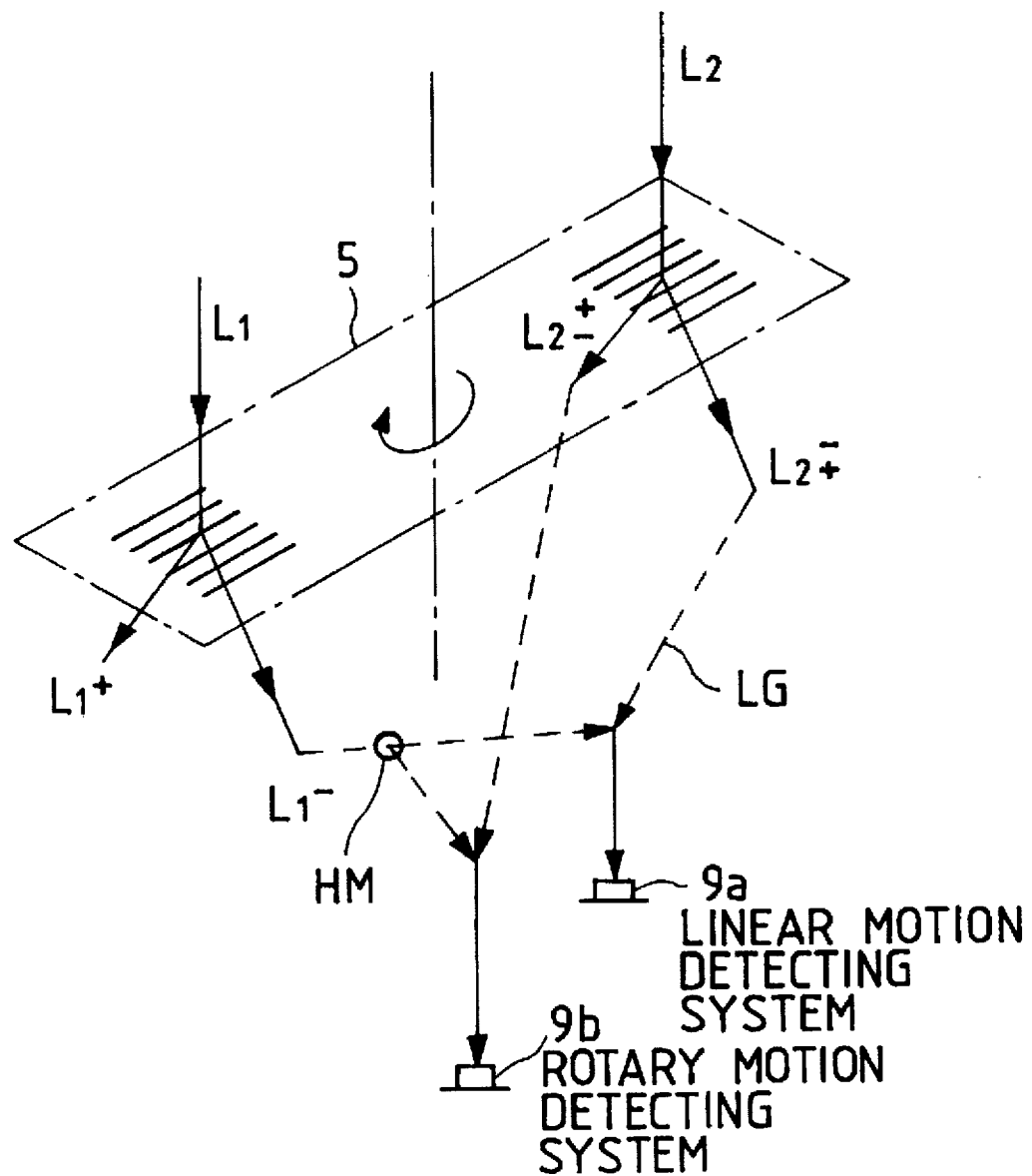
FIG. 11 is a schematic view showing a principal part of a modification of the present invention.

FIG. 11 is a schematic view showing a modification of the present invention. In each of the above embodiments described above, one light beam is incident on one grating. However, in this modification, two light beams are independently incident on and diffracted by two gratings, and diffracted light beams are mixed by light transmission means indicated by dotted lines in FIG. 11, thus achieving the same detection as in the above embodiment. In FIG. 11, LG is light transmission means, and HM is beam splitting means. Note that each suffix indicates the positive/negative sign of the diffraction order. Also, X of $L_{2r}^X$ represents a case wherein a grating irradiated with a light beam $L_2$ moves in the same direction as a grating irradiated with a light beam $L_1$ (linear motion), and Y represents a case wherein the two gratings move in opposite directions (rotary motion).

The two light beams $L_1$ and $L_2$ having coherency are incident on two positions on the gratings arranged on an object to be measured, thereby obtaining +m order diffracted light components and −m order diffracted light components therefrom. Each two beams of these four light beams are caused to overlap each other, as shown in FIG. 11, and detecting systems for these two light beams are arranged as in the above embodiments, thereby independently detecting the rotary and linear motions of a rigid body on which the gratings are arranged.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An apparatus for measuring a displacement of an object, comprising:
   first and second diffraction gratings arranged on the object;
   light source means for irradiating a coherence light beam onto said first and second diffraction gratings;
   first detecting means for causing two light beams whose phases relatively shift upon linear motion of the object, of diffracted light diffracted by said first diffraction grating to interfere with each other to detect the interference light beam; and
   second detecting means for causing two light beams whose phases relatively shift upon rotary motion of the object, of diffracted light diffracted by said second diffraction grating to interfere with each other to detect the interference light beam.

2. An apparatus according to claim 1, wherein the object is a rotary object having a rotation axis, and said second diffraction grating comprises a radial grating which has the rotation axis as a center.

3. An apparatus according to claim 1, wherein the object is a rotary object having a rotation axis, and said first diffraction grating comprises a linear grating arranged in a plane perpendicular to the rotation axis.

4. An apparatus for measuring a displacement of an object, comprising:
   first and second diffraction gratings arranged on the object;
   light source means for irradiating a coherence light beam onto said first diffraction grating;
   light guide means for guiding a plurality of diffracted light components of a predetermined order diffracted by said first diffraction grating to said second diffraction grating;
   first detecting means for causing two light beams whose phases relatively shift upon linear motion of the object of diffracted light diffracted by said second diffraction grating to interfere with each other to detect the interference light beam; and
   second detecting means for causing two light beams whose phases relatively shift upon rotary motion of the object of diffracted light diffracted by said second diffraction grating to interfere with each other to detect the interference light beam.

5. An apparatus according to claim 4, wherein the object is a rotary object having a rotation axis, and each of said first and second diffraction gratings comprises a radial grating which has the rotation axis as a center.

6. An apparatus according to claim 4, wherein the object is a rotary object having a rotation axis, and said first and second diffraction gratings comprise linear gratings arranged in a plane perpendicular to the rotation axis and at positions symmetrical about the rotation axis.

7. An apparatus for measuring a displacement of an object, comprising:
   first and second diffraction gratings arranged on the object;
   light source means for irradiating a coherence light beam onto said first and second diffraction gratings;
   first detecting means for causing diffracted light diffracted by said first diffraction grating and diffracted light diffracted by said second diffraction grating whose phases relatively shift upon linear motion of the object to interfere with each other to detect the interference light beam; and
   second detecting means for causing diffracted light diffracted by said first diffraction grating and diffracted light diffracted by said second diffraction grating whose phases relatively shift upon rotary motion of the object to interfere with each other to detect the interference light beam.

8. An apparatus according to claim 7, wherein the object is a rotary object having a rotation axis, and each of said first and second diffraction gratings comprises a radial grating which has the rotation axis as a center.

9. An apparatus according to claim 7, wherein the object is a rotary object having a rotation axis, and said first and second diffraction gratings comprise linear gratings arranged in a plane perpendicular to the rotation axis and at positions symmetrical about the rotation axis.

10. An apparatus for measuring a displacement of an object, comprising:
    first and second diffraction gratings arranged on the object;
    light source means for irradiating a coherence light beam onto said first and second diffraction gratings;
    first detecting means for causing two light beams whose phases relatively shift upon linear motion of the object, of diffracted light diffracted by said first diffraction grating to interfere with each other to detect the interference light beam; and
    second detecting means for causing diffracted light diffracted by said first diffraction grating and diffracted light diffracted by said second diffraction grating whose phases relatively shift upon rotary motion of the object to interfere with each other to detect the interference light beam.

11. An apparatus according to claim 10, wherein the object is a rotary object having a rotation axis, and each of said first and second diffraction gratings comprises a radial grating which has the rotation axis as a center.

12. An apparatus according to claim 10, wherein the object is a rotary object having a rotation axis, and said first and second diffraction gratings comprise linear gratings arranged in a plane perpendicular to the rotation axis and at positions symmetrical about the rotation axis.

* * * * *

UNITED STATES PATENT AND TRADEMARK OFFICE
CERTIFICATE OF CORRECTION

PATENT NO. : 5,717,488
DATED : February 10, 1998
INVENTOR(S) : Watanabe

It is certified that error appears in the above-identified patent and that said Letters Patent is hereby corrected as shown below:

COLUMN 8:

Line 32, "13aare" should read --13a are--.

Signed and Sealed this

Fourteenth Day of March, 2000

Attest:

Q. TODD DICKINSON

Attesting Officer

Commissioner of Patents and Trademarks